US011704750B2

(12) United States Patent
Ofek (10) Patent No.: US 11,704,750 B2
(45) Date of Patent: *Jul. 18, 2023

(54) METHOD AND APPARATUS FOR OPTIMIZING SELF-POWER CONSUMPTION OF AN ELECTRONIC DEVICE

(71) Applicant: Volpe and Koenig, P.C., Philadelphia, PA (US)

(72) Inventor: Eran Ofek, Modiin (IL)

(73) Assignee: Volpe and Koenig, P.C., Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/573,330

(22) Filed: Jan. 11, 2022

(65) Prior Publication Data

US 2022/0245736 A1 Aug. 4, 2022

Related U.S. Application Data

(63) Continuation of application No. 16/567,020, filed on Sep. 11, 2019, now Pat. No. 11,222,386, which is a continuation of application No. 15/651,637, filed on Jul. 17, 2017, now Pat. No. 10,417,721, which is a continuation of application No. 14/257,557, filed on Apr. 21, 2014, now Pat. No. 9,710,863.

(60) Provisional application No. 61/813,909, filed on Apr. 19, 2013.

(51) Int. Cl.
*G06Q 50/06* (2012.01)

(52) U.S. Cl.
CPC ... *G06Q 50/06* (2013.01); *G05B 2219/32021* (2013.01); *Y02P 70/10* (2015.11); *Y02P 80/10* (2015.11); *Y02P 90/02* (2015.11)

(58) Field of Classification Search
None
See application file for complete search history.

(56) References Cited

U.S. PATENT DOCUMENTS

| | | | |
|---|---|---|---|
| 5,225,765 A | 7/1993 | Callahan et al. |
| 5,475,296 A | 12/1995 | Vinsant et al. |
| 5,581,454 A | 12/1996 | Collins |
| 5,780,789 A | 7/1998 | Tsuji |
| 5,828,568 A | 10/1998 | Sunakawa |

(Continued)

FOREIGN PATENT DOCUMENTS

| | | |
|---|---|---|
| EP | 1283590 A2 | 2/2003 |
| EP | 2590305 A1 | 5/2013 |
| GB | 1197968 A | 7/1970 |

*Primary Examiner* — Isaac Tuku Tecklu
(74) *Attorney, Agent, or Firm* — Volpe Koenig (57) ABSTRACT

A device and method are disclosed for optimizing self-power consumption. The device may sense one or more operating conditions of the device. The device may further select one or more operating parameters associated with at least one of the one or more operating conditions. The device may also estimate a power consumption associated with executing an algorithm to generate at least one updated value for at least one of the one or more operating parameters as well as estimate a power savings associated with operating using the updated value. The device may compare the estimated power consumption to the estimated power savings and determine whether to execute the algorithm based on the comparing.

20 Claims, 7 Drawing Sheets

(56) References Cited

U.S. PATENT DOCUMENTS

| | | | |
|---|---|---|---|
| 6,167,524 A * | 12/2000 | Goodnow | G06F 9/3842 |
| | | | 713/340 |
| 6,323,623 B1 | 11/2001 | Someya et al. | |
| 6,351,396 B1 | 2/2002 | Jacobs | |
| 7,050,798 B2 | 5/2006 | Ranta | |
| 7,143,368 B1 | 11/2006 | Plofsky et al. | |
| 7,412,612 B2 | 8/2008 | Maple et al. | |
| 7,450,326 B2 | 11/2008 | Hidaka | |
| 7,825,672 B2 | 11/2010 | Peck et al. | |
| 8,018,171 B1 | 9/2011 | Melanson et al. | |
| 8,193,715 B2 | 6/2012 | Mehta | |
| 8,479,253 B2 | 7/2013 | Glen | |
| 8,700,444 B2 | 4/2014 | Singh | |
| 8,751,660 B2 | 6/2014 | Kaneko et al. | |
| 8,804,272 B1 | 8/2014 | Dakroub et al. | |
| 9,128,704 B2 | 9/2015 | Kato et al. | |
| 9,549,248 B2 | 1/2017 | Holzmann | |
| 9,916,087 B2 | 3/2018 | Thangaraj | |
| 2001/0046146 A1 | 11/2001 | Batarseh et al. | |
| 2004/0025068 A1 | 2/2004 | Gary et al. | |
| 2004/0036458 A1 | 2/2004 | Johnson et al. | |
| 2004/0113890 A1 * | 6/2004 | Ranta | G06F 3/038 |
| | | | 713/300 |
| 2005/0083025 A1 | 4/2005 | Brown | |
| 2007/0121355 A1 | 5/2007 | Zierhofer | |
| 2007/0236200 A1 | 10/2007 | Canfield et al. | |
| 2007/0273430 A1 | 11/2007 | Akashi et al. | |
| 2008/0031023 A1 | 2/2008 | Kitagawa et al. | |
| 2008/0058999 A1 | 3/2008 | Khodorkovsky et al. | |
| 2008/0082844 A1 | 4/2008 | Ghiasi et al. | |
| 2008/0172567 A1 | 7/2008 | Zhang et al. | |
| 2008/0184263 A1 * | 7/2008 | Tamiya | G06F 11/3409 |
| | | | 719/315 |
| 2008/0186319 A1 | 8/2008 | Boner et al. | |
| 2008/0224629 A1 | 9/2008 | Melanson et al. | |
| 2008/0258697 A1 | 10/2008 | Gehrke | |
| 2008/0285184 A1 | 11/2008 | Phadke et al. | |
| 2008/0285192 A1 | 11/2008 | Phadke et al. | |
| 2009/0013204 A1 | 1/2009 | Kobayashi et al. | |
| 2009/0077399 A1 | 3/2009 | Nodo et al. | |
| 2009/0129133 A1 | 5/2009 | Khan | |
| 2009/0262562 A1 | 10/2009 | Yang | |
| 2010/0017242 A1 | 1/2010 | Hamilton, II et al. | |
| 2010/0218027 A1 | 8/2010 | Boss et al. | |
| 2010/0220507 A1 | 9/2010 | Schroeder et al. | |
| 2010/0305890 A1 | 12/2010 | Huang | |
| 2011/0047552 A1 | 2/2011 | Mergen et al. | |
| 2011/0050326 A1 | 3/2011 | Cook et al. | |
| 2011/0060927 A1 | 3/2011 | Filingim et al. | |
| 2011/0109263 A1 | 5/2011 | Sakoda et al. | |
| 2011/0153106 A1 | 6/2011 | Drake et al. | |
| 2011/0185203 A1 | 7/2011 | Carlson et al. | |
| 2011/0199016 A1 | 8/2011 | Rinaldi | |
| 2011/0227633 A1 | 9/2011 | Mo et al. | |
| 2011/0231026 A1 | 9/2011 | Yaoyama | |
| 2012/0044719 A1 | 2/2012 | Ehret et al. | |
| 2012/0066526 A1 | 3/2012 | Salsbery | |
| 2012/0078427 A1 | 3/2012 | Jang et al. | |
| 2012/0092900 A1 | 4/2012 | Orr | |
| 2012/0101652 A1 | 4/2012 | Shin et al. | |
| 2012/0112720 A1 | 5/2012 | Remmert | |
| 2012/0163038 A1 | 6/2012 | Park et al. | |
| 2012/0175956 A1 | 7/2012 | Kitamura et al. | |
| 2012/0197448 A1 | 8/2012 | Shin et al. | |
| 2012/0239219 A1 * | 9/2012 | Forbes, Jr. | H02J 9/061 |
| | | | 700/295 |
| 2012/0250360 A1 | 10/2012 | Orr et al. | |
| 2012/0262954 A1 | 10/2012 | Duvnjak | |
| 2013/0002230 A1 | 1/2013 | Starkweather, Sr. | |
| 2013/0039104 A1 | 2/2013 | Sharma | |
| 2013/0073883 A1 | 3/2013 | Vick et al. | |
| 2013/0110423 A1 | 5/2013 | Zimmerman et al. | |
| 2013/0132759 A1 | 5/2013 | Lathrop et al. | |
| 2013/0278224 A1 | 10/2013 | Ofek | |
| 2013/0279223 A1 | 10/2013 | Ofek | |
| 2013/0279224 A1 | 10/2013 | Ofek | |
| 2013/0279226 A1 | 10/2013 | Ofek | |
| 2014/0046496 A1 * | 2/2014 | Mise | G06Q 10/06 |
| | | | 700/291 |
| 2014/0074306 A1 | 3/2014 | Lu et al. | |
| 2014/0089699 A1 * | 3/2014 | O'Connor | G09G 5/363 |
| | | | 713/300 |
| 2014/0143179 A1 * | 5/2014 | Takaoka | G06Q 10/04 |
| | | | 705/412 |
| 2014/0159585 A1 | 6/2014 | Reed | |
| 2014/0185327 A1 | 7/2014 | Shah | |
| 2014/0222229 A1 | 8/2014 | Teranishi et al. | |
| 2014/0236375 A1 | 8/2014 | Ikeda et al. | |
| 2015/0046679 A1 | 2/2015 | Gathala et al. | |
| 2015/0134140 A1 * | 5/2015 | Jang | G05B 15/02 |
| | | | 700/295 |
| 2015/0276826 A1 * | 10/2015 | Roosli | G01R 21/00 |
| | | | 702/61 |
| 2016/0170476 A1 | 6/2016 | Fu et al. | |
| 2017/0344091 A1 | 11/2017 | Ting et al. | |

\* cited by examiner

METHOD AND APPARATUS FOR OPTIMIZING SELF-POWER CONSUMPTION OF AN ELECTRONIC DEVICE

CROSS REFERENCE TO RELATED APPLICATION

This application is a continuation of U.S. patent application Ser. No. 16/567,020, filed on Sep. 11, 2019, which issued as U.S. Pat. No. 11,222,386 on Jan. 11, 2022, which is a continuation of U.S. patent application Ser. No. 15/651,637, filed on Jul. 17, 2017, which issued as U.S. Pat. No. 10,417,721 on Sep. 17, 2019, which is continuation of U.S. patent application Ser. No. 14/257,557, filed on Apr. 21, 2014, which issued as U.S. Pat. No. 9,710,863 on Jul. 18, 2017, which claims priority from U.S. Provisional Patent Application No. 61/813,909, filed on Apr. 19, 2013, which are incorporated by reference as if fully set forth.

BACKGROUND

In a typical controller-based device, the device may perform calculations to influence its operation using sensed and/or pre-defined data. The calculations may be typically carried out in real time. Operating parameters of the device which may influence how the device operates may be set based on the results of the calculations.

These calculations may be computationally expensive and may consume a relatively large amount of power compared to the overall power consumed by the device itself. For example, a digital controller-based AC-DC power converter may calibrate its operating parameters based upon sensing and calculations. The power consumed through the execution of the sensing and calculation procedures may be significant. The overall efficiency of the AC-DC power converter may suffer from the losses due to the significant overhead associated with intensive calculations.

SUMMARY

A method and apparatus for optimizing self-power consumption of a controller-based device is disclosed. The method and apparatus configured in accordance with the teachings herein may monitor and evaluate the power consumed by calculations performed by the device to control its operation. The device may compare the power consumed by performing the calculations with the power saved by updating the system to operate in accordance with the results of the calculations. The device may then determine how, when, and/or how frequently to perform the calculations to optimize the power consumption of the device.

In one embodiment, a method of optimizing self-power consumption of a controller-based device may include sensing, via one or more sensors, one or more operating conditions of the controller-based device. The method may further include selecting, by the controller, one or more operating parameters associated with at least one of the one or more operating conditions. The method may further include estimating, by the controller, a power consumption associated with executing an algorithm to generate at least one updated value for at least one of the one or more operating parameters. The method may further include estimating, by the controller, a power savings associated with operating using the updated value. The method may further include comparing the estimated power consumption to the estimated power savings and determining whether to execute the algorithm based on the comparing.

In another embodiment, the method may further include selecting, by the controller, a complexity level of the algorithm, and estimating the power consumption associated with executing the algorithm of the selected complexity level.

In another embodiment, the selected complexity may be based on the estimated power consumption being less than the estimated power savings.

In another embodiment, the method may further include selecting, by the controller, a frequency with which to perform the algorithm, wherein the comparing further includes comparing the estimated power consumption associated with executing the algorithm at the selected frequency with the estimated power savings.

In another embodiment, the method may further include executing, by the controller, the algorithm on a condition the estimated power consumption is less than the estimated power savings, wherein the algorithm generates at least one updated value. The method may further include updating, via the controller, at least one of the one or more operating parameters with the at least one updated value. The method may further include sensing, via the one or more sensors, the one or more operating conditions resulting from the at least updated operating parameter.

In another embodiment, the method may further include tracking, by the controller, a history of power savings and power consumption associated with executed algorithms. The method may further include determining, by the controller, whether to execute the algorithm based on the comparing and further based on the tracked history.

In another embodiment, the method may further include assigning, by the controller, a respective priority to each of the one or more operating conditions and determining, by the controller, whether to execute the algorithm based on the comparing and further based on at least one assigned priority.

In another embodiment, the method may further include selecting, by the controller, a complexity level of the algorithm based on the at least one assigned priority.

In another embodiment, the one or more operating conditions may include a battery level and the one or more operating parameters may include a transmission parameter. The method may further include determining, by the controller, whether to execute the algorithm to update the transmission parameter based on the battery level.

In another embodiment, the controller-based device may be a power converter and the one or more operating parameters may include a timing of a switch for converting input energy to output energy. The method may further include determining, by the controller, to forego execution of the algorithm based on the comparing.

In another embodiment a controller-based device capable of optimizing self-power consumption may include one or more sensors configured to send one or more operating conditions of the controller-based device. The controller of the device may be configured to select one or more operating parameters associated with at least one of the one or more operating conditions. The controller may be further configured to estimate a power consumption associated with executing an algorithm to generate at least one updated value for at least one of the one or more operating parameters. The controller may be further configured to estimate a power savings associated with operating using the updated value. The controller may be further configured to compare the estimated power consumption to the estimated power savings. The controller may be further configured to determine whether to execute the algorithm based on the comparison.

In another embodiment, the controller may be further configured to select a complexity level of the algorithm. The controller may be further configured to estimate the power consumption associated with executing the algorithm of the selected complexity level.

In another embodiment, the selected complexity may be based on the estimated power consumption being less than the estimated power savings.

In another embodiment, the controller may be further configured to select a frequency with which to perform the algorithm and compare the estimated power consumption associated with executing the algorithm at the selected frequency with the estimated power savings.

In another embodiment, the controller may be further configured to execute the algorithm on a condition the estimated power consumption is less than the estimated power savings, wherein the algorithm generates the at least one updated value. The controller may be further configured to update at least one of the one or more operating parameters with the at least one updated value. The one or more sensors of the device may be further configured to sense the one or more operating conditions resulting from the at least one updated operating parameter.

In another embodiment, the controller may be further configured to track a history of power savings and power consumption associated with executed algorithms and to determine whether to execute the algorithm based on the comparison and further based on the tracked history.

In another embodiment, the controller may be further configured to assign a respective priority to each of the one or more operating conditions and to determine whether to execute the algorithm based on the comparison and further based on at least one assigned priority.

In another embodiment, the controller may be further configured to select a complexity level of the algorithm based on the at least one assigned priority.

In another embodiment, the one or more operating conditions may include a battery level and the one or more operating parameters may include a transmission parameter. The controller may be further configured to determine whether to execute the algorithm to update the transmission parameter based on the battery level.

In another embodiment, the controller-based device may be a power converter and the one or more operating parameters may include a timing of a switch for converting input energy to output energy. The controller may be further configured to forego execution of the algorithm based on the comparison.

DETAILED DESCRIPTION OF THE PREFERRED EMBODIMENTS

In one embodiment of a device configured in accordance with the teachings here, the device may determine how and when to optimally carry out calculations involved in the operation of the device. The device may first estimate an amount of energy required to execute a calculation. A controller of the device may be programmed to execute such a calculation. For instance, the device may perform calculations to determine an operating parameter which may influence the operation of the device. The device may determine the potential benefit of operating with an updated operating parameter obtained from the results of the calculations and weigh the benefit against the cost of performing the calculations. The device may then determine whether to execute the calculations, at what level of complexity to perform the calculations, how frequently to perform the calculations, whether to perform the calculation, or whether to forego performing the calculation.

For instance, a power converter in accordance with an embodiment of the teachings herein may calculate settings or values for operating parameters which may alter the manner in which the power converter converts an input power to an output power. For example, the power converter may calculate an adjustment to the switching timing of a switch of the power converter to influence an operating condition of the power converter. An example operating condition may include any of: power conversion efficiency, harmonics, temperature, expected output voltage, stored energy level, inductance-based energy storage, storage capacitor voltage, start-up energy storage levels, output ripple, voltage and current draw of the load, rate of discharge of the storage capacitor, voltage and current of the input power source, frequency of the input power source, the rate of change or slope of the input power source, the resonant frequency and a change in the resonant frequency of an LLC converter, the temperature of the LLC converter, the present position along the input A/C waveform, the fluctuation profile of power consumption of the load, power factor, information or commands provided by the load or user, over-voltage and/or over-current conditions of the input and/or output, mechanical noise or vibrations, characteristics of the mechanical noise or vibrations, noise profile of the input power source, electromagnetic interference (EMI), any other factor (or combination of factors) which may be desirably affected, controlled, adjusted and/or monitored.

Figure 1:
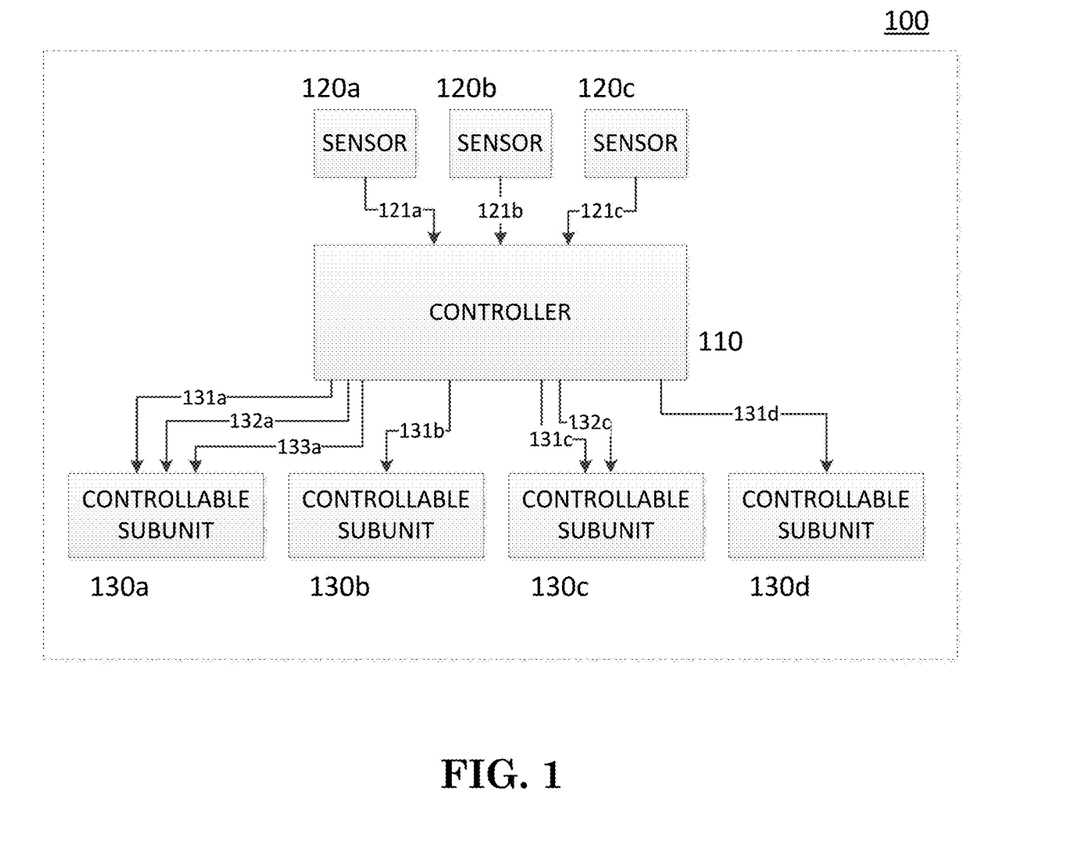
FIG. 1 is a diagram depicting an example embodiment of a controller-based device configured in accordance with the teachings herein.

FIG. 1 depicts an example embodiment of a device configured in accordance with the teachings herein. A device 100 may include a controller 110 which may be operatively coupled to a plurality of sensors 120a-120c via connections 121a-121c. Although FIG. 1 depicts three sensors 120, any number of sensors may be included. Furthermore, the sensors may be connected in any sensible arrangement and via any number of connections. Controller 110 may also be operatively coupled to a plurality of controllable subunits 130a-130d via a plurality of control lines. For example, as depicted in FIG. 1, controllable subunit 130a may be operatively coupled to the controller 110 via control lines 131a, 132a, and 133a. Although FIG. 1 depicts four controllable subunits 130, any number of controllable subunits may be included. Though each controllable subunit 130 is depicted with a particular number of control lines, any number of control lines may be present. Furthermore, the control lines may be part of a bus interface such that control lines are shared across multiple controllable subunits 130 and further control signals may be broadcast to a plurality of controllable subunits 130 or may be directed to one or more particular controllable subunits. Controller 110 may be configured to receive signals from sensors 120a-120c to sense and determine operating conditions of device 100.

For example, device 100 may be a power converter, subunit 130c may be an input stage of the power converter, and subunit 130b may be an output stage of the power converter. Sensor 120a may sense an input current of the input stage, sensor 120b may sense an input voltage of the input stage, and sensor 120c may sense an output voltage of the output stage. Controller 110 may estimate the power savings associated with updating an operating parameter of the output stage and may estimate the power consumed by running operations to sense the appropriate operating conditions and to calculate a new value for the operating parameter. An example of an operating parameter may be a switching frequency of a switch. The controller 110 may then compare the estimated power savings to the estimated power consumption. If the power savings are greater than the power consumption, the controller 110 may decide to perform the sensing and execute the calculations to update operation with the new switching frequency. However, if the controller 110 determines that the estimated power savings would be less than the power consumed by the procedures to update the switching frequency, then the controller 110 may forego the procedures and continue to operate with the same switching frequency.

In another embodiment of a device configured in accordance with the teachings herein, the device may assign priorities or weights to different operating parameters and different operating conditions. The device may evaluate the relative benefit of operating at an updated operating parameter corresponding to an improved operating condition, which is weighted accordingly, and determine whether the cost associated with performing the calculations are worth the relative benefit. For example, a device may determine that intensive calculations resulting in a particular improvement in power conversion efficiency may be worth the energy expended in performing the particular intensive calculations because power conversion efficiency may have a high priority or may be heavily weighted in importance. However, calculations of similar intensity resulting in similar energy expenditure for improving a harmonics output level may be determined to be relatively too high compared to the benefit of the particular improvement in harmonics due to a lower priority for harmonics performance or due to a lower weighting factor applied to harmonics performance.

On the other hand, the device may determine the calculations should be executed if the harmonics improvement is expected to be more substantial. In yet another example, the relative weighting or priority of a particular operating condition may change based on the current operating conditions. For example, if a power converter is currently operating with very poor harmonics output such that the harmonics are at an unacceptable level, the power converter may determine the benefit of improving harmonics is very high, and hence the harmonics output may be heavily weighted. As such, the power converting may likely determine the calculations necessary to update one or more operating parameters to improve harmonics performance should be executed. Additionally or alternative, the power converting may implement a priority or weighting to the harmonics performance in such a condition wherein the power converter may be required to perform the calculations without consideration of the power expenditure associated with the calculations.

The principles disclosed herein may be implemented in a device such that a cost associated with any procedure may be estimated. A benefit of utilizing the result of a procedure may also be estimated. A weight may be applied to the estimated benefit based on its relative importance to the operation of the device. The device may then perform the procedure if the estimated, weighted benefits are determined to be worthwhile compared to the cost of the procedure. If the cost is determined to be relatively too high compared to the benefit of the procedure, the device may decide to delay, skip, or indefinitely forego the procedure.

Figure 2:
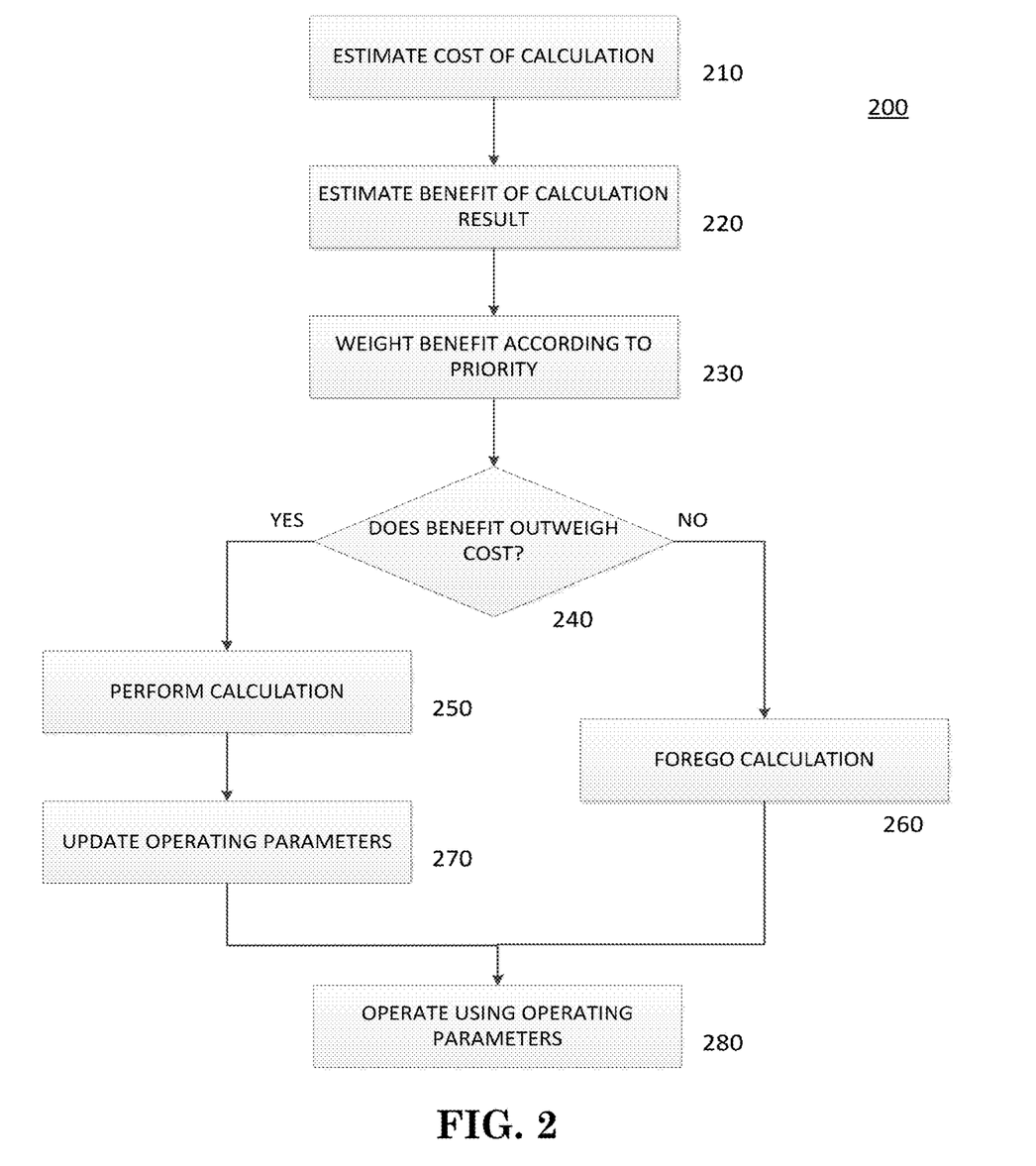
FIG. 2 is a flow diagram depicting an example method to be performed by a device configured in accordance with the teachings herein.

FIG. 2 is a flow diagram depicting an example method 200 that may be performed by a device configured in accordance with the teachings herein. For example, at step 210 the device may estimate the cost of performing a calculation used to update some operating parameter of the device. Examples of the cost may include the power consumed in performing the calculation, the processing capacity occupied by the calculation that may otherwise be used for other purposes, the memory occupied by the calculation, the delay in operation associated with performing the calculation, etc.

At step 220, the device may estimate a benefit associated with obtaining and utilizing the result of the calculation. For example, the device may determine the power savings the device may experience by operating with parameters updated by the calculation, the device may determine a processing speed increase associated with using updated parameters, the device may determine an increase in a signal to noise ratio associated with using the updated parameters, etc. Steps 210 and 220 may be combined so that an estimation of the cost and benefit may be performed at the same time. Alternatively, the order of steps 210 and 220 may be reversed so that the benefit may be estimated before the cost.

At step 230, the device may apply a weight to the estimated benefit. The weight may be based on the relative importance or priority of the benefit to the overall performance of the device. Though not depicted, the device may further apply a weight to the estimated cost of the calculation based on the relative importance or priority of the effect the cost may have on the overall performance of the device. The device may alternatively skip applying any weights to the benefit or to the cost.

At step 240, the device may determine whether the benefit outweighs the cost. Again, either or both of the benefit and cost may be appropriately weighted and the weights may affect the determination. Further, the weights may be dynamically set by the device depending on the current operating conditions and current priorities of the device. If the device determines the benefit outweighs the cost, the device may move to step 250 and perform the calculation. The device may then update operating parameters at step 270 based on the calculation. Steps 250 and 270 may also be combined so that the calculation may include updating the operating parameters. If the device determines at step 240 that the benefit does not outweigh the cost, the device may move to step 260 and hence forego the calculation. As such, operating parameters may not be updated. The device may then move to step 280 to operate using the operating parameters.

The method depicted in FIG. 2 should not be construed to only cover the particular order of steps depicted. As explained above, steps may be reordered, combined, omitted, or split up in any manner which one of ordinary skill in the art would recognize as producing a useful result for the intended purpose of optimizing operation.

Figure 3:
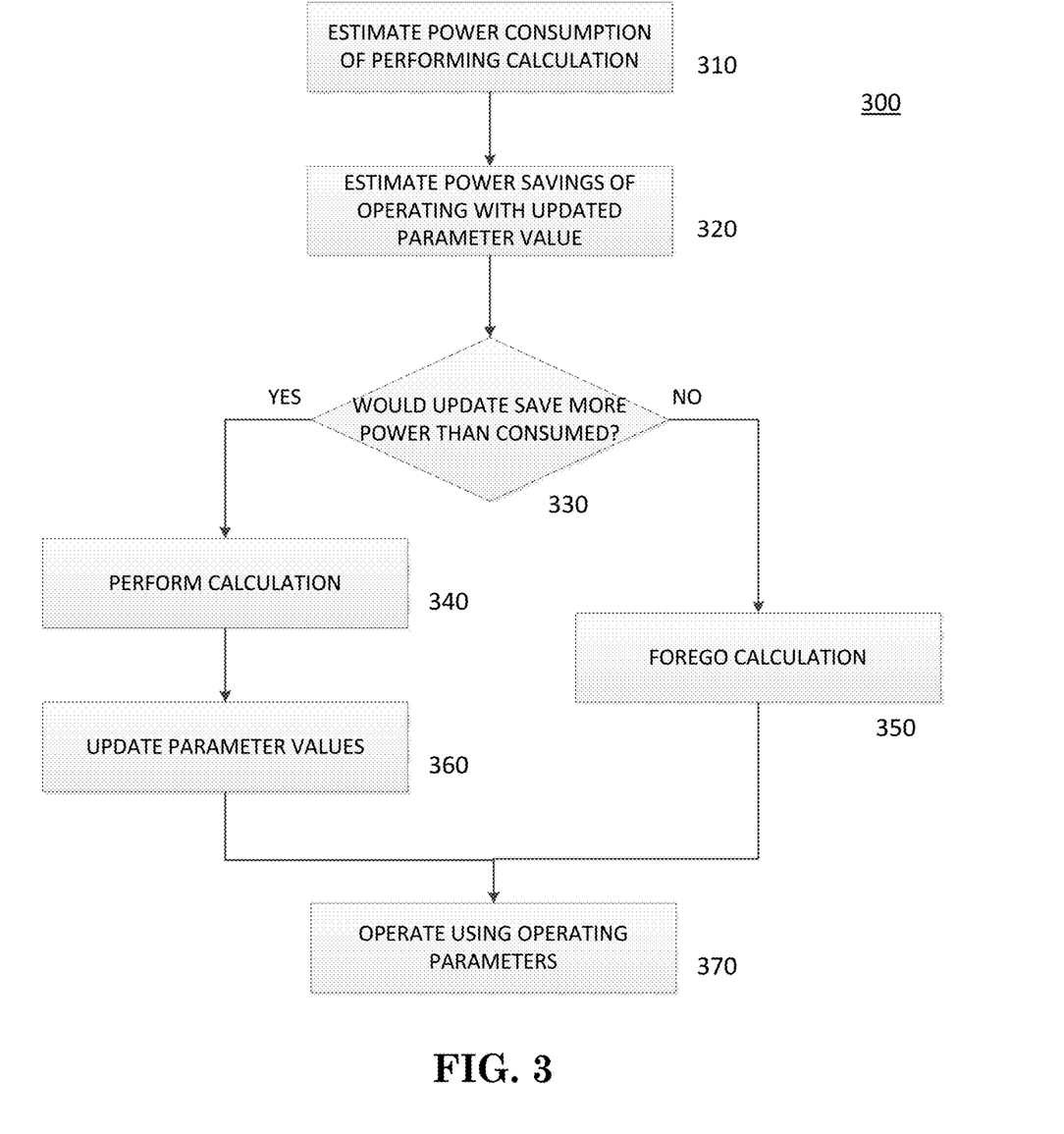
FIG. 3 is a flow diagram depicting another example method to be performed by a device configured in accordance with the teachings herein.

FIG. 3 is a flow diagram depicting an example method 300 that may be performed by a device configured in accordance with the teachings herein. At step 310, the device may estimate the power consumption required to perform a calculation used to calculate an updated operating parameter. For example, a controller-based power converter may estimate the power necessary to execute an algorithm to determine an updated internal control voltage. At step 320, the device may estimate the predicted power savings associated with the device operating using the updated value of the operating parameter. For example, a controller-based power converter may estimate how much power would be saved by operating at the updated internal control voltage. At steps 310 and 320, the device may estimate power consumption and power savings, respectively, associated with calculating and using multiple operating parameters. Steps 310 and 320 may be combined so that an estimation of the consumed power and saved power may be performed at the same time. Alternatively, the order of steps 310 and 320 may be reversed so that the saved power may be estimated before the consumed power.

At step 330, the device may determine whether the estimated power savings associated with operating with the newly updated operating parameter would be greater than the power consumed by performing the calculations. If the device determines the estimated power savings are greater than the estimated power consumption, the device may move to step 340 and perform the calculation. The device may then update the operating parameter value with the newly calculated value at step 360. Steps 340 and 360 may also be combined so that the calculation may include updating the operating parameter. If the device determines at step 330 that the estimated power savings are not greater than the estimated power consumed, the device may move to step 350 and forego the calculation. As such, the operating parameter may not be updated with a new value. In this case, the device would then move to step 370 and continue to operate using the present operating parameter value. If the device had updated the operating parameter at step 360, then the device would move to step 370 and operate using the updated operating parameter value.

The method depicted in FIG. 3 should not be construed to only cover the particular order of steps depicted. Steps may be reordered, combined, omitted, or split up in any manner which one of ordinary skill in the art would recognize as producing a useful result for the intended purpose of optimizing operation.

In yet another example embodiment, a battery powered device may determine whether or not to perform calculations, may determine a complexity level of a computation, or may determine a frequency of performing calculations, based on a level of battery power remaining. The battery powered device may assign a different priority values to different levels of reserve battery power. Alternatively or additionally, the battery powered device may assign a weight to a certain amount of reserve battery power to reflect its importance. The battery powered device may also assign a priority or a weight to a transmission parameter. For example, the transmission parameter may be associated with sending a transmission beam in a particular direction with a certain level of accuracy. For instance, the battery powered device may estimate the power consumed by calculations of a first complexity level executed at a first periodicity for updating a transmission beam direction and may weight the power consumption according to an associated priority. The battery powered device may further determine the remaining battery power and weight the importance of conserving the battery power based on the amount remaining. The battery powered device may then determine whether to execute the transmission beam direction calculations by comparing the relative benefit of the updated transmission beam direction to the benefit of conserving battery power. Hence, one may envision that the transmission beam direction update calculations may be performed when the remaining battery power is relatively high, but may forego the calculations or perform them such that they require less power consumption when the remaining battery power is relatively lower.

One should recognize that the example embodiments disclosed herein are for illustrative purposes and should not be construed to reduce the scope of the devices implemented in accordance with the teachings herein. A device in accordance with the embodiments disclosed herein should not be construed to only evaluate power conversion efficiency versus harmonics performance. Nor should one necessarily construe power conversion efficiency to be relatively more important to a device than harmonics performance. Likewise, devices may be powered via any means or may be part of the powering circuitry of a device.

The calculation may further take into consideration multiple operating conditions when calculating and determining an adjustment. The device, for example a power converter, may then compare an estimated improvement in efficiency of the device against the energy cost associated with performing the calculation and may then determine how and when to perform the calculation or to forego performing the calculation.

In another embodiment of a device configured in accordance with the teachings herein, a controller of the device may be configured to determine an interval between calculations or may determine a frequency with which to perform the calculations. The device may learn, through tracking operating statistics, an optimal number of calculation cycles to optimize performance of the device.

For example, a power converter configured in accordance with the teachings herein may determine how to change the particular calculations to be performed, may determine when calculations should be performed, or may determine how often calculations should be performed to influence operation of the power converter. The power converter may learn how and when to perform calculations through tracking a history of the efficiency of the power converter, the calculation statistics, and the settings of the operating parameters. In this way, the power converter may evaluate the tradeoff between the power expenditure overhead associated with calculations versus operating at the newly calculated settings. The power converter may determine the power required to execute procedures to calculate a more efficient setting for one or more operating parameters and determine the savings associated with operating at these new, more optimal settings and compare this cost/benefit to the power saved by foregoing the calculations, but operating with potentially less-optimal settings which may waste power. The power converter may learn when or with what frequency or interval the efficiency improvements resulting from calculating new operating parameters outweigh the power consumed performing the calculations, and to perform the calculations accordingly.

In another embodiment of a device configured in accordance with the teachings herein, a controller of the device may perform a simplified routine to estimate how many instructions may be required in a calculation, to estimate how much energy may be required to execute the calculation, and to estimate the benefit in performing the calculation. The simplified routine may consume little power compared to the power consumed by the calculation of interest or to the potential power savings resulting from operating at the newly calculated operating parameters. An example of the simplified routine may be a look-up in a look-up table.

In yet another embodiment of a device configured in accordance with the teachings herein, the device may be capable of performing a plurality of algorithms. Further, the device may be capable of performing multiple levels of complexity of an algorithm. An algorithms or a level of complexity of an algorithm may be rated by its expected energy consumption. The device may select an algorithm of the plurality of algorithms and may select a complexity level of an algorithm to be performed based on logic. The logic may itself consume very little energy to determine which algorithm to perform. As an example, the logic may select an algorithm which may cause the system to consume less power during the calculation of the algorithm than the power saved by using the result of the calculation. For instance, a device may determine that a relatively low complexity algorithm for calculating a new operating parameter may result in more power savings operating at the updated operating parameter than expended in the execution of the calculations. However, a relatively more complex algorithm may calculate an operating parameter which may result in even more power savings than the relatively low complexity algorithm, but the power consumed in performing the relatively complex algorithm may be too high. The consumed power in performing the calculations may be higher than the power saved by operating at the updated operating parameter. As such, the device may choose to perform the relatively lower complexity algorithm over the relatively higher complexity algorithm.

Figure 4:
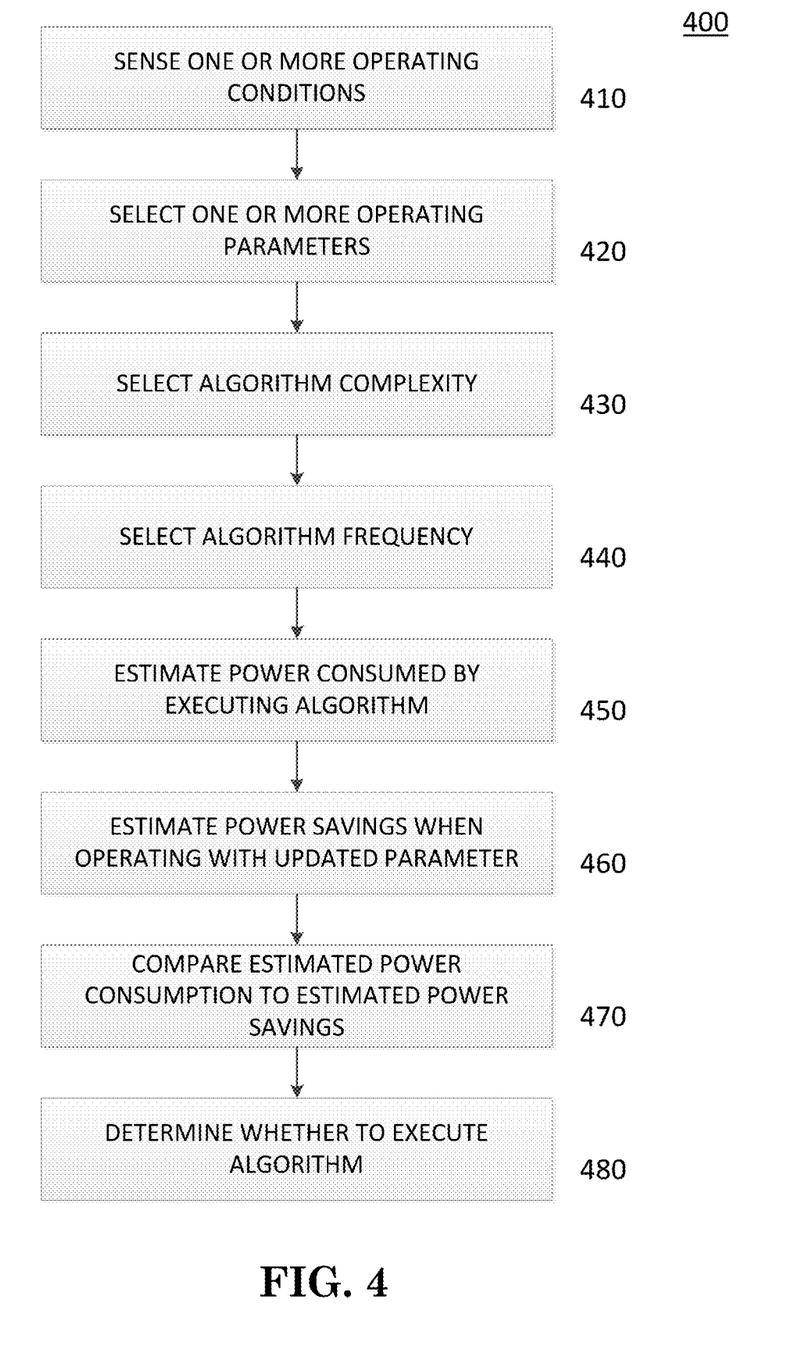
FIG. 4 is a flow diagram depicting another example method to be performed by a device configured in accordance with the teachings herein.

FIG. 4 depicts another example of a method 400 which may be performed by a device configured in accordance with the teachings herein. At step 410, the device may sense one or more operating conditions. At step 420, the device may select one or more operating parameters of interest. The operating parameters may affect the sensed operating conditions. For example, a device may sense a switching frequency and may select a control voltage which controls the switching frequency. At step 430, the device may select one or more algorithms and may further select levels of complexity of the algorithms used for calculating updated operating parameters. At step 440, the device may select a frequency with which the algorithm should be periodically executed. At step 450, the device may estimate the power that would be consumed by executing the selected algorithms of the selected complexities executed at the selected frequencies. At step 460, the device may estimate the power savings associated with the device operating using the newly updated operating parameter values instead of the previous values. At step 470, the device may compare the estimated power consumption of running the selected algorithms at the selected settings to the estimated power savings. At step 480, based on the comparison, the device may decide whether to execute the algorithms or not.

The method depicted in FIG. 4 should not be construed to only cover the particular order of steps depicted. Steps may be reordered, combined, omitted, or split up in any manner which one of ordinary skill in the art would recognize as producing a useful result for the intended purpose of optimizing operation.

As another example, the device may learn through tracking the statistics of the operation of the device and select the algorithm which historically yielded the best operation. For instance, a power converter may decide to execute the calculations involved in a selected algorithm and decide an interval defining how frequently the power converter may perform the calculations. The decision may be based on tracked historical statistics associated with which decisions yielded the highest conversion efficiency of the power converter while experiencing operating conditions similar to current operating conditions.

Figure 5:
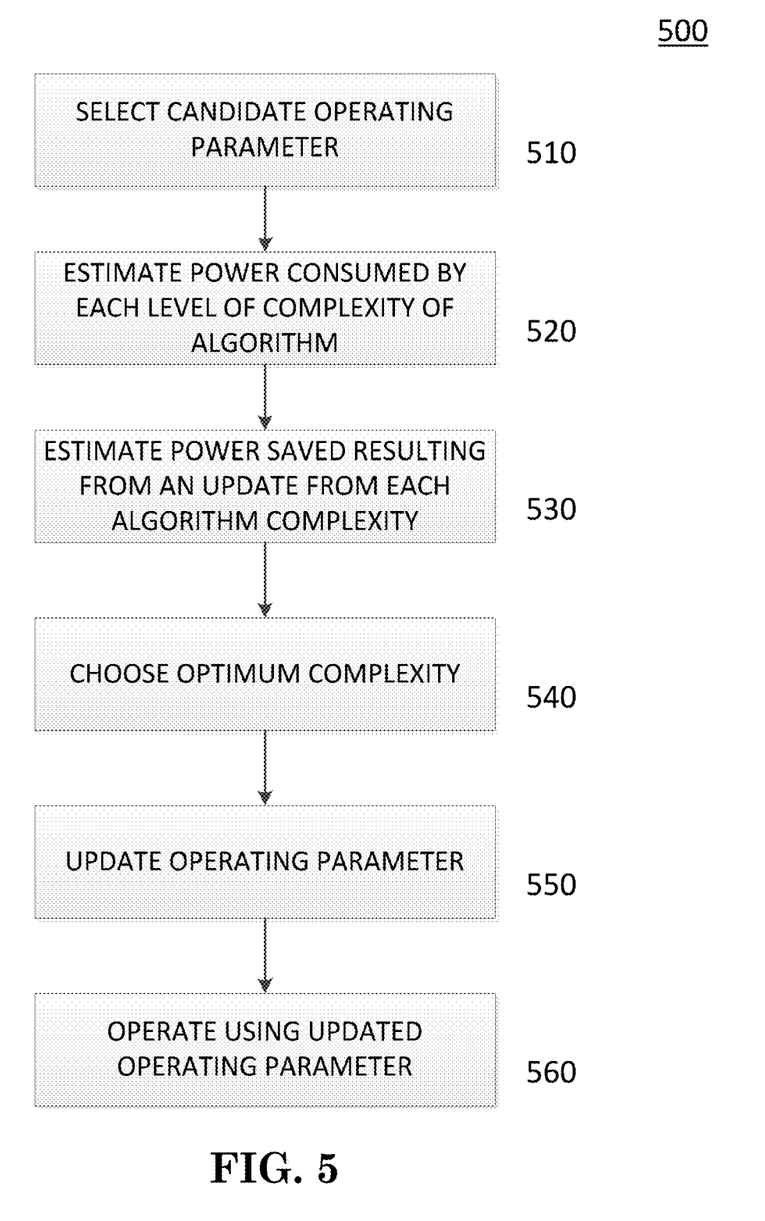
FIG. 5 is a flow diagram depicting another example method to be performed by a device configured in accordance with the teachings herein.

FIG. 5 is a flow diagram depicting another example method 500 that may be performed by a device configured in accordance with the teachings herein. At step 510, the device may select a candidate operating parameter for possible recalculation and updating. The device may be capable of executing an algorithm of different levels of complexity for calculating an updated value for the selected operating parameter. At step 520, the device may estimate power consumed by the algorithm at each level of complexity. At step 530, the device may estimate the power saved by operating with the result of the algorithm at each level of complexity. For example, a relatively higher level of complexity may result in an updated value of finer precision which may cause the device to operate relatively more precisely and hence save relatively more power. At step 540, the device may weigh the costs associated with the power consumed by the algorithm at the different levels of complexity with their associated power savings and determine which level of complexity results in the best net power savings or most optimum net benefit. At step 550, the device may update the operating parameter with the result of the algorithm at the chosen complexity. At step 560, the device may operate using the updated operating parameter.

The method depicted in FIG. 5 should not be construed to only cover the particular order of steps depicted. Steps may be reordered, combined, omitted, or split up in any manner which one of ordinary skill in the art would recognize as producing a useful result for the intended purpose of optimizing operation.

In another embodiment of a device configured in accordance with the teachings herein, the device may be capable of performing a plurality of algorithms and may rate the algorithms according to their expected energy consumptions. The device may implement logic to select one of the plurality of algorithms. For example, the system may determine one of the plurality of algorithms, including algorithms of three different complexities, to perform. The plurality of algorithms may include a most simplified complexity algorithm that may require the least amount of energy to perform, a computationally-intensive algorithm that may require the most amount of energy to perform, and a normal complexity algorithm that may require a moderate amount of energy to perform that is more than that of the simplified complexity algorithm and less than that of the computationally-intensive algorithm. The device may implement logic which selects which of the three algorithms to execute and a frequency at which to execute the selected algorithm.

The device may evaluate the performance of the system by sensing various operating conditions. The device may fine tune operating parameters which influence the operating conditions of the system through the execution of selected algorithms and may determine optimal algorithms and their frequency of execution. The device may do so by evaluating the tradeoff between the estimated power or learned power expended, via tracking a performance history of the device, by performing the calculations of the newly fined-tuned, more optimal operating parameters and the power saved by operating at the newly fine-tuned, more optimal operating parameters.

In another embodiment, the device may determine which operating factors of a plurality of operating factors to sense and how frequently to sense the selected operating factors. For instance, a power converter configured in accordance with the teachings herein may be designed to output 19 volts direct current (DC). The power converter may not need to sense the output voltage or may determine to sense the output voltage sparingly in order to conserve the power associated with performing the sensing operations. The power converter may determine to more frequently sense operating factors that may fluctuate more rapidly or unpredictably or factors which may have a greater effect on the operation of the power converter. In this way, the power converter may decide how and when to sense operating factors to optimize self-power consumption.

As another example, the power converter may sense a voltage across a component of the power converter which may influence the power conversion efficiency of the device. Maintaining an optimal level of the voltage may help to obtain optimal efficiency of the device, however, sensing and calculating the optimal voltage may come at the cost of self-power consumption overhead which may degrade the overall efficiency of the device. As such, the power converter may determine how and when/at what frequency to optimally sense and calculate the voltage level to optimize the overall efficiency of the device. The device may do so by tracking a history of its selected algorithms and timing/frequency of execution of the algorithms and by making subsequent selections based on the selections which were determined to be most optimal. Similarly, the device may track a history of sensing procedures and subsequently select sensing procedures, such as the timing or frequency of sensing, based on the past, tracked sensing procedures which resulted in optimal operation.

Figure 6:
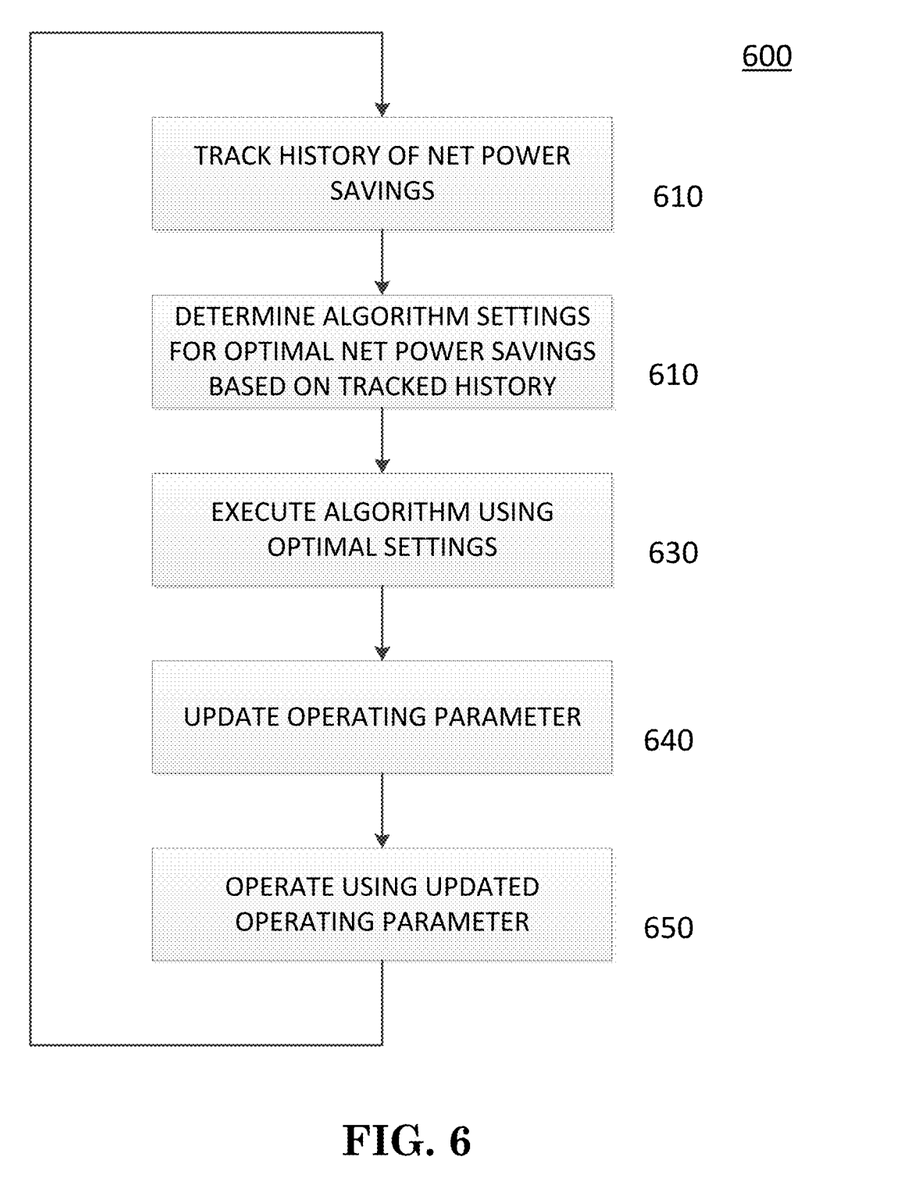
FIG. 6 is a flow diagram depicting another example method to be performed by a device configured in accordance with the teachings herein.

FIG. 6 is a flow diagram depicting another example method 600 that may be performed by a device configured in accordance with the teachings herein. The device may run a looped process wherein a performance history is tracked and used to govern the operation decisions of the device. At step 610, the device may track and may store a history of net power savings. The device may store a list of settings chosen for an algorithm used to calculate an updated value for an operating parameter. The device may further track the net power savings associated with the chosen settings and algorithm. Furthermore, the device may track the operating conditions experienced for the chosen algorithm settings which resulted in the associated power savings.

At step 620, the device may determine the optimum algorithm settings for calculating an updated operating parameter based on the tracked history. For example, the device may select a complexity level and particular computation to perform to calculate a new operating parameter based on a history of tracked choices and outcomes. The device may further correlate currently observed operating conditions with previously stored conditions and select optimal settings for performing the computations based on data stored from prior selections chosen during similar operating conditions.

At step 630, the device may execute the selected algorithm using the optimal settings determined based on the tracked history. At step 640, the device may then update the operating parameter with the output of the executed algorithm. At step 650, the device may operate using the updated operating parameter and may then return to step 610 wherein the device will again track operating conditions, operating parameters, a history of selecting algorithm settings, and net power savings to use in making subsequent optimal calculation decisions.

The method depicted in FIG. 6 should not be construed to only cover the particular order of steps depicted. Steps may be reordered, combined, omitted, or split up in any manner which one of ordinary skill in the art would recognize as producing a useful result for the intended purpose of optimizing operation.

In yet another embodiment of a device configured in accordance with the teachings herein, in addition to optimizing self-power consumption, the device may also optimize the response time of performing calculations. In order to fulfill requirements of operation, the device may need or prefer to perform calculations within a specified period of time. For instance, the device may need or prefer to perform calculations for each sample of sensed inputs. The device may sample the sensed input at a set or dynamic sampling frequency. As such, the device may need to quickly process the sample through calculations within the time period established by the sampling frequency. The device may be configured to determine and select an algorithm which may be completed within the established time period.

An example device configured to optimize the response time of performing calculations may include a processor configured to execute a plurality of algorithms to yield an operating parameter value. The processor may execute one of the plurality of algorithms, wherein each of the plurality of algorithms has a different level of complexity corresponding to different levels of resolution of its respective result. For instance, the device may wish to calculate an internal voltage level of the device and may select among a plurality of algorithms of different complexities to calculate the voltage level. A relatively low complexity algorithm, which may require a relatively low amount of power to execute and may be completely executed in a relatively short time, may yield a relatively course resolution voltage level. A relatively high complexity algorithm, which may require a relatively high amount of power to execute and may be completely executed over a relatively long time, may yield a relatively fine resolution voltage level. A relatively medium complexity algorithm, which may require an amount of power greater than that of the relatively low complexity algorithm but less than that of the relatively high complexity algorithm and may be completely executed in less time than the relatively high complexity algorithm but taking more time than the relatively low complexity algorithm, and may yield a relatively medium resolution result between than of the relatively low complexity algorithm result and the relatively high complexity algorithm result. The processor of the device may run a simple and fast analysis, which requires very little power, to determine which algorithm is best suited for the task based on an estimation of the time it would take to complete the calculations within a required time period. If the time necessary to complete the selected calculation took longer than the required time period, then the processor may learn and adjust its selection for the next instance of running the algorithm so that a lower complexity algorithm is chosen such that it is completed within the required time period. In this way, the device may learn which selections result in optimal operation and use the learned optimal selections to optimize its operation over time.

In yet another example embodiment of a device configured in accordance with the teachings herein, an algorithm of a particular complexity may be selected by the device to be performed which completes in too short of a period of time. In such case, the device may rate this algorithm with a lower rating due to its timing not being ideal. The device may then select a more complex algorithm which may take longer to execute at the next available and appropriate opportunity. In this way, the device may recall a previously selected algorithm and complexity level of the algorithm to use as a default which presently may not be the most optimal choice. The algorithm may be executed and evaluated and the device may change the algorithm or complexity level of the algorithm to a more optimal choice given the operating conditions to optimize operation over time.

In yet another example embodiment of a device configured in accordance with the teachings herein, the device may reduce the number of iterative calculations necessary to perform a task. The device may, before executing an algorithm, estimate the time period over which the algorithm should be executed and the desired level of resolution to determine an appropriate algorithm and complexity level of the algorithm to complete the task while meeting the resolution and time requirements. The algorithm may also be selected based on user preference for response time and/or bandwidth availability.

In yet another example embodiment of a device configured in accordance with the teachings herein, the device may be configured with a plurality of available algorithms to perform a task. Before executing the calculations involved in a chosen algorithm, factors used in the calculations may be first preloaded or calculated as a preprogrammed configuration for executing the algorithm. The preloaded or calculated configurations and factors may be determined based on timing requirements, power consumption requirements, resolution of the result of the calculations, accuracy of the result of the calculations, etc. The device may be configured to choose from a plurality of algorithms and a plurality of configurations. For instance, a first algorithm may be available with one or more variables programmed with a first pre-calculated set of values. The first algorithm may be available with the one or more variables programmed with a second pre-calculated set of values. A second algorithm may also be available with one or more variables programmed with a third pre-calculated set of values. The second algorithm may also be available with the one or more variables programmed with a fourth set of values. In this way, the system may additionally select an algorithm and a particular configuration, which may include the particular programming of one or more variables, for the algorithm based on run-time requirements. As an example, the one or more configurable variables may include the complexity of the algorithm.

In yet another example embodiment, a device configured in accordance with the teachings herein may include a main processor or controller. The main processor or controller may instruct a separate processor or component to perform a desired calculation. The main processor may address the separate processor and may supply to the separate processor the run-time requirements for executing the calculation, which may include power consumption requirements, required time, bandwidth resources, resolution of the result, etc. Alternatively, the main processor may provide a subset of run-time requirements or no requirements and allow the external processor or component to determine and select the necessary configuration to optimize operation of the device and optimize the instructed calculations.

In yet another example embodiment, a device configured in accordance with the teachings herein may test an algorithm before it is needed in a real-time situation to predetermine the characteristics of the calculations involved to better select algorithms in the real-time situation. For instance, the device may run tests on the algorithms to process test data and monitor operation to determine a cost of execution. For example, the device may perform measurements to determine an estimated length of time needed to run the calculations, the complexity level and power consumed by running the calculations, and the bandwidth requirements to run an iteration of the algorithm. By performing tests on the algorithms, the device may better determine the execution cost or performance characteristics of the particular algorithms, including a selected configuration of the algorithm, when the particular algorithms are executed in a real-time operational environment. As previously described, the system may run the algorithms on any of a plurality of external processor or components. The system may further perform tests across the plurality of external processors and record statistics for the algorithms tested on a respective external processor.

Figure 7:
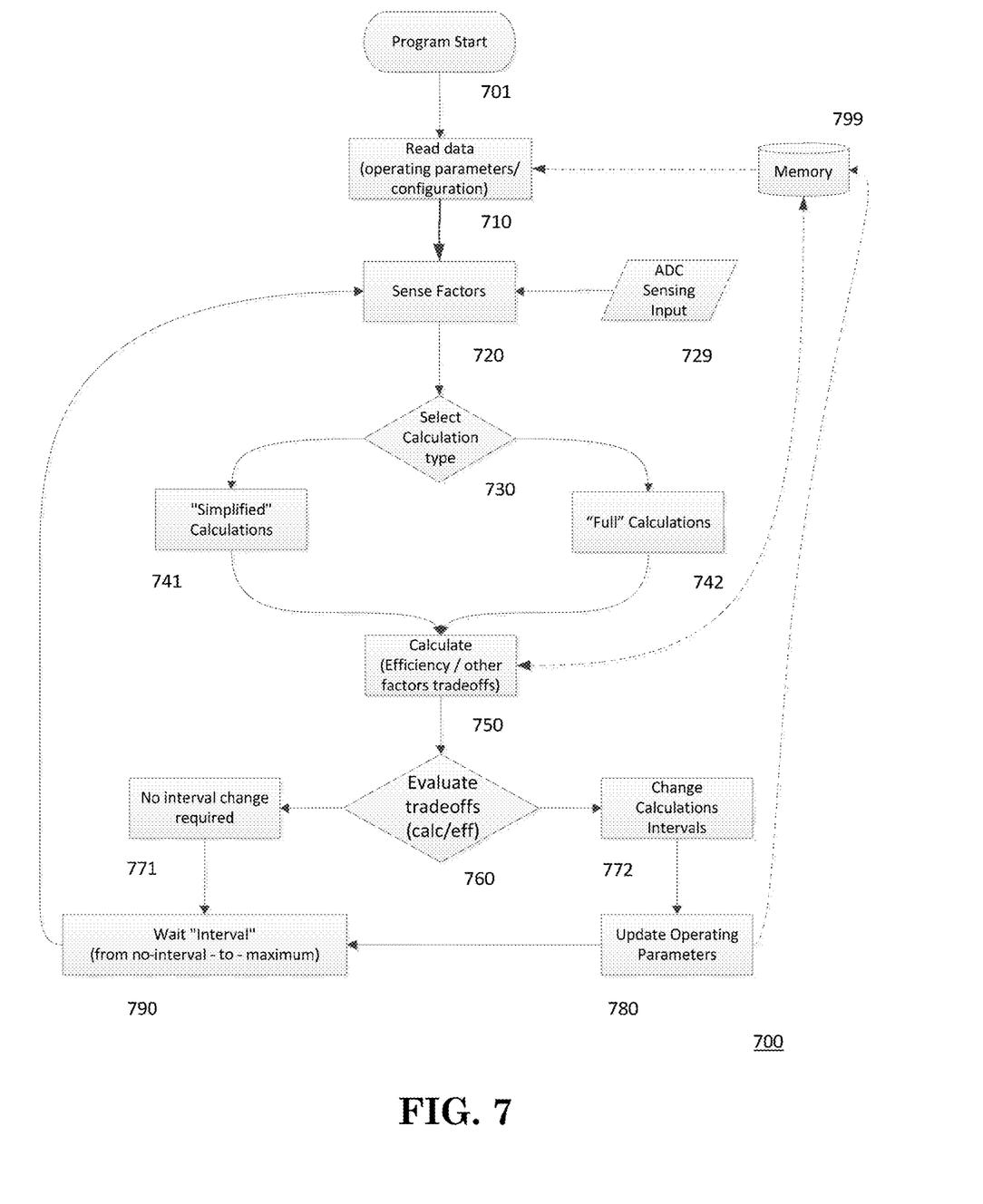
FIG. 7 is a diagram depicting an example method for optimizing self-power consumption of a controller-based power converter configured in accordance with the teachings herein.

FIG. 7 is a diagram depicting an example method 700 that may be implemented by a power converter configured in accordance with the teachings herein. The power converter may start a program 701 and may read data and/or configuration settings from memory 799 at step 710. The power converter may then sense factors at step 720 and may receive sensed data 729 from sensors included in the power converter which monitor operating factors of interest.

At step 730, the power converter may select a type of calculation to perform. In this example, the power converter may select between two levels of calculations: "simplified" calculations 741 and "full" calculations 742. However, the power converter in other embodiments may select from additional levels of calculations. The power converter may estimate the power needed to perform the calculations and may select the type of calculation to perform based on the estimated power. Alternatively, the system may store values, for instance in a look-up table, associated with the power necessary to perform the calculations. Furthermore, in other embodiments, only one algorithm may be available and hence the system will effectively skip step 730 and perform the calculations associated with the only available calculation.

At step 750, the power converter may then calculate the efficiency of the system and/or other operating factors using either "simplified" calculations 741 or "full" calculations 742. The power converter may also exchange data with memory and may store calculated values into memory and may load values from memory. At step 760, the power converter may evaluate tradeoffs between the energy cost of performing the calculations of the type selected at step 730 and the benefits of updating the power converter's operating parameters to values calculated at step 750. For instance, the power converter may evaluate the energy cost of calculating and setting a new operating voltage of a resonator within the power converter versus the estimated energy savings associated with operating at the calculated new operating voltage. If the power converter determines at step 760 that the interval between performing the calculations of the selected type are optimal, the system may move to step 771 and not update the interval. If the power converter determines at step 760 that the interval between performing the calculations with the selected type is sub-optimal, the system may move to step 772 to change the interval between performing the calculations. The power converter may then update the operating parameters 780 including the calculation interval and may store these parameters into memory 799. The power converter then waits the determined interval at step 790. The power converter may then return to step 720 to again sense factors and repeat the process to continue to evaluate operation and update how and when the system performs calculations for optimal performance.

Though the example method depicted in FIG. 7 shows the power converter may update (step 772) or maintain an interval (step 771) of calculations as a result of the evaluation at step 760, the power converter may alternatively or additionally evaluate the tradeoffs between a level of calculation selected at step 730 or may alternatively or additionally evaluate the length of time taken to completely execute the calculation choices.

The method depicted in FIG. 7 should not be construed to only cover the particular order of steps depicted. As explained above, steps may be reordered, combined, omitted, or split up in any manner which one of ordinary skill in the art would recognize as producing a useful result for the intended purpose of optimizing operation.

Power sensitive devices may be well-suited for incorporation of the teachings herein. Examples of power sensitive devices include satellites, medical implants, battery and energy storage driven portable electronics, mobile phones, tablets, laptops, etc.

The aforementioned embodiments provide a method and apparatus for optimizing the self-power consumption of controller-based devices. Although the embodiments describe example arrangements and combinations of features, a system in accordance with the teachings herein may incorporate any combination of the described features, capabilities, and configurations. One of ordinary skill in the art will appreciate that each embodiment, feature, or element can be used alone or in any combination with the other embodiments, features, and elements.

In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A controller or processor in association with software or logic may be used to implement the disclosed methods.

What is claimed is:

1. A method of reducing self-energy consumption of an electronic device, the method comprising:
    calculating a first energy difference and a second energy difference, wherein:
        the first energy difference is a difference between a first estimated energy saved resulting from operating the electronic device using a first updated value and a first estimated energy that is consumed by the electronic device to complete execution of a first algorithm that determines the first updated value, and
        the second energy difference is a difference between a second estimated energy saved resulting from operating the electronic device using a second updated value and a second estimated energy that is consumed by the electronic device to complete execution of a second algorithm that determined the second updated value;
    selecting the first algorithm and updating an operating parameter using the first updated value on a condition that the first energy difference is greater than the second energy difference and otherwise selecting the second algorithm and updating the operating parameter using the second updated value; and
    operating the electronic device using the updated operating parameter.

2. The method of claim 1, wherein the first algorithm has first complexity level, and wherein the second algorithm is the first algorithm with a second complexity level.

3. The method of claim 1, further comprising:
    selecting a frequency at which to calculate an updated value for the operating parameter.

4. The method of claim 3, further comprising:
    comparing an estimated amount of energy consumed by calculating the updated value at the selected frequency to an estimated amount of energy saved by operating the electronic device using the updated value at the selected frequency.

5. The method of claim 1, further comprising:
    tracking a history of energy savings and energy consumption associated with executed algorithms; and
    determining whether to execute further algorithms based on the tracked history of energy savings and energy consumption.

6. The method of claim 1, further comprising:
    selecting the operating parameter from a plurality of operating parameters based on a priority.

7. The method of claim 1, wherein the electronic device is a power converter, and wherein the operating parameter is a timing of a switch for converting input energy to output energy, the method further comprising:
    updating the timing of the switch based on the selecting of the first algorithm or the second algorithm.

8. The method of claim 1, wherein the electronic device is a battery-powered device, wherein the method further comprises:
    determining whether to execute the first algorithm based on a battery level.

9. The method of claim 1, further comprising:
    monitoring an operating condition of the electronic device.

10. The method of claim 9, wherein the operating condition is affected by the operating parameter.

11. An electronic device capable of reducing self-energy consumption, the electronic device comprising:
    one or more sensors, a controller, and at least one controllable subunit;
    the controller configured to:
        calculate a first energy difference and a second energy difference, wherein:
            the first energy difference is a difference between a first estimated energy saved resulting from operating the electronic device using a first updated value and a first estimated energy that is consumed by the electronic device to complete execution of a first algorithm that determines the first updated value, and
            the second energy difference is a difference between a second estimated energy saved resulting from operating the electronic device using a second updated value and a second estimated energy that is consumed by the electronic device to complete execution of a second algorithm that determined the second updated value;

select the first algorithm and update an operating parameter using the first updated value on a condition that the first energy difference is greater than the second energy difference and otherwise select the second algorithm and update the operating parameter using the second updated value; and control the subunit of the at least one controllable subunit using the updated operating parameter.

12. The electronic device of claim 11, wherein the first algorithm has first complexity level, and wherein the second algorithm is the first algorithm with a second complexity level.

13. The electronic device of claim 11, wherein the controller is further configured to:

select a frequency at which to calculate an updated value for the operating parameter.

14. The electronic device of claim 13, wherein the controller is further configured to:

compare an estimated amount of energy consumed by calculating the updated value at the selected frequency to an estimated amount of energy saved by controlling the subunit of the at least one controllable subunit using the updated value at the selected frequency.

15. The electronic device of claim 11, wherein the controller is further configured to:

track a history of energy savings and energy consumption associated with executed algorithms; and determine whether to execute further algorithms based on the tracked history of energy savings and energy consumption.

16. The electronic device of claim 11, wherein the controller is further configured to:

select the operating parameter from a plurality of operating parameters based on a priority.

17. The electronic device of claim 11, wherein the electronic device is a power converter, wherein the electronic device further comprises a switch, wherein the operating parameter is a timing of the switch for converting input energy to output energy, and wherein the controller is further configured to:

update the timing of the switch based on the selecting of the first algorithm or the second algorithm.

18. The electronic device of claim 11, wherein the electronic device is a battery-powered device, and wherein the controller is further configured to:

determine whether to execute the first algorithm based on a battery level.

19. The electronic device of claim 11, wherein the controller is further configured to:

monitor an operating condition of the electronic device.

20. The electronic device of claim 19, wherein the operating condition is affected by the operating parameter.

* * * * *